Patented May 16, 1933

1,909,357

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

EFFECTING SPLITTING REACTIONS BY MEANS OF ELECTRONIC DISCHARGE

No Drawing.   Application filed July 8, 1929. Serial No. 376,869.

In the past it has been known to carry out the removal of CO or $CO_2$ groups from organic compounds by passing them in admixture with steam or with hydrogen and in the absence or presence of diluting gases over splitting catalysts. These reactions are however open to certain disadvantages, since it is difficult under some circumstances to control the course of the reaction with certainty.

I have now found that these reactions can be effected in an entirely novel manner. This is done by taking advantage of the ionizing influence which is a characteristic of all electronic discharges whether these are due purely to photo-chemical effects, to corpuscular action or to a combination of these. It is not at present definitely determined how discharges of this type operate or whether their action is due entirely to the ionizing effect. However, all the forms of electronic discharge which have been found to be applicable to this class of reaction have also been found to produce ionizing effects upon gases. The primary effect of these discharges may consist in loosening the valence electrons of the compounds from which CO or $CO_2$ is to be split off in such a manner as to render the molecule chemically active, but it is to be understood that the invention is not dependent upon any theory of activity due to ionization.

The materials to be acted upon may be subjected to electronic discharges of various types. These may take the form of simple electrical discharges such as high-frequency discharges, spark discharges, brush discharges, corona discharges, arc discharges or silent electric discharge. Other forms of electronic discharge which may be used are ultra violet light, cathode rays, as well as X- or Roentgen rays. Alpha or beta particles as well as recoil atoms thereof have been found to be particularly effective in reactions of this type, but due to the comparatively small influence at present commercially available their reaction is somewhat slower than other forms of radiant energy. Other more specialized forms of light rays, such as those having resonating qualities, may also be used, for example the resonance radiation from a quartz mercury vapor lamp.

These various forms of electronic discharge find a particularly suitable application in conducting reactions where it is desired to split off a CO or $CO_2$ group from a hydrocarbon nucleus such, for example, as in decarboxylations.

Examples of such types of reaction are the production of monocarboxylic acids from polycarboxylic acid substances or their anhydrides or esters as well as some substitution products, as for example the production of benzoic acid from phthalic anhydride or phthalic acid in the presence of steam or hydrogen or both; the production of naphthalic acid from naphthalic anhydride, phenylbenzoic acid from diphenic acid, acrylic or propionic acid from maleic acid, and valeric acid from adipic acid. In all of these cases where polycarboxylic acids are treated the anhydride may be used instead and such processes are included as a part of the present invention.

Splitting reactions in which the influence of electronic discharges is used may be carried out in the liquid or in the vapor phase and the progress of the reaction may be dependent entirely upon the influence of such discharges or the latter may be used in combination with other accelerating means, for example, catalysts. It is a particular and unique advantage of the electronic discharges used in the present invention that the amount of reaction produced is not proportional to the electrical energy or ionic charge carried by the particles, but in most cases is many times as great, which permits the use of enormous gas speeds and volumes with a comparatively small input of electrical energy. This phenomenon would seem to be due to the clustering effects of gaseous or liquid molecules positively or negatively charged by the corpuscular activating agent. A molecule so charged, acquires the power of attracting to itself other uncharged molecules from the surrounding medium and binding them into a nucleus. This power of attraction has been found to be especially effective in the removal of carboxyl groups. A further advantage is that higher pressures need not be used when diluting gases are present, since the reaction takes place in an open tube and the intimate contact of all portions of the gas stream with a reaction promoting surface is unnecessary.

The above described action is also of advantage where the gases are intended subsequently to be brought into contact with a catalyst. Since the ionizing gases are drawn into clusters and are in a particularly advantageous state for catalytic action, a part or all of the reaction mixture with or without diluting gases may be first activated in this manner and then subjected to catalysis. The catalyst may be a granular mass or may be supported on carrier fragments in the usual manner. The results of the activation are also very fully realized when a catalytic dust is used, which is entrained with the reaction mixture and later separated from the gaseous products, either mechanically or by the use of an electrostatic field, and returned for further reaction after having been given a purification treatment if necessary.

When this method is used the clustering action draws the gases into intimate contact with each catalyst particle and materially aids the reaction. The action may be further promoted by charging the catalytic dust itself either before admixture or in the presence of the reaction gases, which in this case may or may not have received a preliminary electronic treatment as the conditions may require.

In carrying out these splitting reactions in the vapor phase ordinary atmospheric pressures are preferred. Pressures higher than atmospheric may be advantageous in some instances, for example where materials of relatively low molecular weight are being acted upon. Conversely pressures lower than atmospheric are in some cases advantageous for example where it is not desired to use high potential currents or where a "clean up action" is desired.

In some of these splitting reactions no reagent other than the material to be acted upon is necessary, the clustering effect referred to being sufficient to drive out molecules of CO and/or $CO_2$ and to cause combination of the hydrogen with the remaining hydrocarbon nucleus. Other reactions require the presence of steam and/or hydrogen or other reducing gases such as methyl alcohol, gasoline, etc. or of hydrogen and oxides of carbon to cause the reaction to proceed properly. The reaction may take place either in the presence or absence of diluting gases.

Another advantage of the present invention is that one or all of the reagent materials may be activated separately before or during their passage through the reaction chamber. Activation of some of the constituents of the mixture presents the advantage that undesired condensations are minimized in cases where they might result if the whole reaction mixture were treated. For example, in some mixtures a single element or reaction component such as hydrogen may be activated. This separate treatment permits the use of methods of activation which might present difficulties if applied to the reaction mixture as a whole. For example, it has been found that if a mixture of hydrogen and mercury vapor be subjected to the resonance radiation of mercury by exposing it to the light from a cooled mercury arc, the atoms of mercury absorbing such resonance radiation are converted to so-called excited mercury atoms and these excited atoms are capable of decomposing hydrogen molecules by collision, probably into atomic constituents. Hydrogen so activated may be separated from the mercury vapor and mixed with other reaction components, thus providing a powerful method of treatment which would be impossible with a heterogeneous mixture of vapors and gases. In some cases it is also advantageous to utilize, simultaneously or successively, the influence of two or more of the same or of varying types of discharge, depending upon the specific action desired. For example, a mixture of CO or $CO_2$ and $H_2$ either with or without diluting gases, may be given a preliminary treatment by one kind of discharge, mixed with the organic carboxy compounds and the mixture then acted upon by another discharge or by a catalyst. The advantage here obtained is that since a part of the reaction mixture is already in an activated state the final reaction proceeds with much greater facility, thereby permitting greater gas speeds. This method of treatment is particularly useful in cases where for any reason it is desired to overload a converter for by activating part or all of the gases much greater volumes may be passed over the same amount of catalyst without materially lowering the yields obtained.

It can easily be seen that the various specific actions exerted by these several forms of discharge provide the physical chemist with means for carrying out many finely graded types of reaction, since by the simultaneous use of supplementing or opposing discharges a differential effect may be produced comparable to the use of stabilizing and stabilizer promoting effects in catalyses.

The invention will be described in greater detail in the following specific examples which set forth a few representative processes, it being understood that the invention is in no sense limited to the specific details there in set forth.

Example 1

Phthalic anhydride vapors and steam or reducing gases and vapors or both together with hydrogen are passed at a temperature of 360 to 420° C. through a tube in which they are subjected to the action of an alternating electric field preferably of high frequency and high voltage.

Large quantities of benzoic acid are obtained which can be readily separated from impurities. In many cases the product shows a melting point of 123 to 124° C. and therefore consists of chemically pure benzoic acid which can be used for medicinal or food preservative purposes.

Instead of the high frequency discharge an arc discharge between electrodes made of or coated with tungsten, molybdenum, tantalum or compounds, or alloys thereof may be used. These electrodes are preferably water cooled and diverge in the direction of the gas stream. In a similar manner a carboxy group may be split off from maleic acid or naphthalic anhydride.

Example 2

Hydrogen is activated by being subjected to the influence of a silent electric discharge, an alternating current of 10,000 to 15,000 volts being given by the induction coil. The gas is then mixed with phthalic anhydride vapors and steam, and the mixture again treated with the silent electric discharge or with a high frequency discharge, as described in Example 1. In many cases the use of steam may be dispensed with, and good yields of benzaldehyde and benzoic acid result.

The above process may also be applied to substituted phthalic anhydrides such as halogen or nitro substituted phthalic anhydride.

Example 3

A mixture of methyl alcohol, steam and phthalic anhydride vapors, which may be diluted with other gases, such as nitrogen is passed through a reaction zone in which it is first acted upon by a high frequency discharge, as in Example 1, and then by the silent discharge. The nascent oxides of carbon, the formation of which is promoted by the high frequency electric field, exert a stabilizing and regulating effect and the reaction is more finely toned by the diluting gases present. The reaction product is a benzoic acid of excellent purity. With lower gas speeds benzaldehyde will also be obtained as well as small amounts of methyl and benzylbenzoate.

Example 4

Hydrogen and mercury vapors in the presence of metallic mercury in a quartz tube are exposed to the light from a cooled mercury arc. The resulting activated hydrogen is then separated from the mercury vapor and is brought into admixture with steam and phthalic anhydride vapors in the lower end of a reaction chamber. A zinc oxide catalyst in the form of a fine powder is also blown into the chamber at the lower end, either by a portion of the reaction mixture itself or by a diluting gas. The catalytic dust is entrained into the gas stream containing the reaction mixture, and the whole propelled upwardly through the chamber. The zinc oxide is separated from the resulting products by means of cyclone separator or by passing the mixture through a Cottrell precipitator. The zinc oxide so separated is returned to the lower end of the reaction chamber to be used again and the benzoic acid vapors are later condensed and purified if necessary.

Example 5

A mixture of gasoline and phthalic anhydride vapors, either in the absence or in presence of diluting gases, is passed at a temperature of 300–400° C. through a tube in which is supported a horizontal mercury vapor quartz lamp. The lamp should be run for a considerable period before passing the vapors over it, in order to establish an efficient equilibrium of all the reacting components. It will be found better to provide only a narrow space around the lamp, so that all portions of the reacting gases are brought under the influence of ultra violet radiation. A mixture of benzaldehyde and benzoic acid results, which may easily be separated into its components by fractional condensation.

Example 6

Water gas or hydrogen and carbon dioxide, or a mixture of these, is first exposed in a reaction tube to the effects of a high frequency discharge, or to light from a quartz-mercury vapor lamp. The activated products are then mixed with phthalic anhydride vapors in the ratio of 1 kilo of phthalic anhydride to a 6–10 cbm. of hydrogen used and passed at temperature of 360–420° C. over a splitting catalyst such as quartz fragments impregnated with a uniform coating of freshly reduced copper, zinc, or iron oxide, or with aluminum vanadate. Two or three component aluminum zeolites or non-silicious base exchange bodies containing aluminum may also be used, as well as those containing other elements, such as iron, zinc, chromium or lead, either singly or in admixture, and other elements such as cobalt, nickel, iron, magnesium, barium or lead may be introduced by base exchange. A product is obtained which consists principally of benzoic acid, the yields being about 60-90% of the theory based on the amount of phthalic anhydride consumed.

In a similar manner methyl phthalate may be treated, the resulting product contains some methyl and benzylbenzoate in addition to benzoic acid and these by-products can be readily separated in the usual manner.

What is claimed as new is:

1. The process of producing monocarboxylic substances which comprises subjecting a gas stream containing vapors of organic polycarboxylic acid substances to the influence of electronic discharge at elevated temperatures.

2. The process of producing monocarboxylic acid substances which comprises subjecting a gas stream containing vapors of phthalic acid substances to the influence of electronic discharge at elevated temperatures.

3. The process which comprises subjecting vapors of phthalic acid substances mixed with reducing gases to the influence of electronic discharge.

4. The process which comprises subjecting vapors of phthalic anhydride mixed with a reducing gas to the influence of electronic discharge.

5. A process of producing monocarboxylic acid substances, which comprises vaporizing polycarboxylic acid substances, activating the vapors by subjecting them to the influence of electronic discharge, at elevated temperatures and immediately effecting completion of the reaction.

6. In the process of carrying out vapor phase catalytic reactions involving the decarboxylation of a polycarboxylic acid substance the steps which comprise activating at least one of the reagents by subjection to the influence of electronic discharge and immediately bringing the reagents into contact with a catalyst at elevated temperatures.

7. The process of producing benzoic acid and benzaldehyde which comprises immediately reacting vapors of phthalic acid substances at elevated temperatures with reducing gases which have been activated by the influence of electronic discharge.

8. The process of producing benzoic acid and benzaldehyde which comprises subjecting vapors of reducing gases to the action of electronic discharge, mixing them with vaporized phthalic acid substances and subjecting the mixture to further action of electronic discharge.

9. The process of claim 8 in which the first discharge is a high frequency discharge and the second is a silent electric discharge.

10. A method according to claim 6 in which the catalyst is entrained in the reaction gases in the form of a fine dust.

11. In the process of carrying out a catalytic vapor phase splitting of phthalic acid substances the steps which comprise activating at least one of the reagents by subjection to the influence of electronic discharge and immediately bringing the reagents into contact with a catalyst at elevated temperatures.

Signed at Pittsburgh, Pennsylvania, this 6th day of July, 1929.

ALPHONS O. JAEGER.